CROSS REFERENCE EXAMINER
J. F. MASCHER.
BEST AVAILABLE COPY
Book for Photographs, &c.
No. 134. A. I. Patented Feb. 19, 1856.
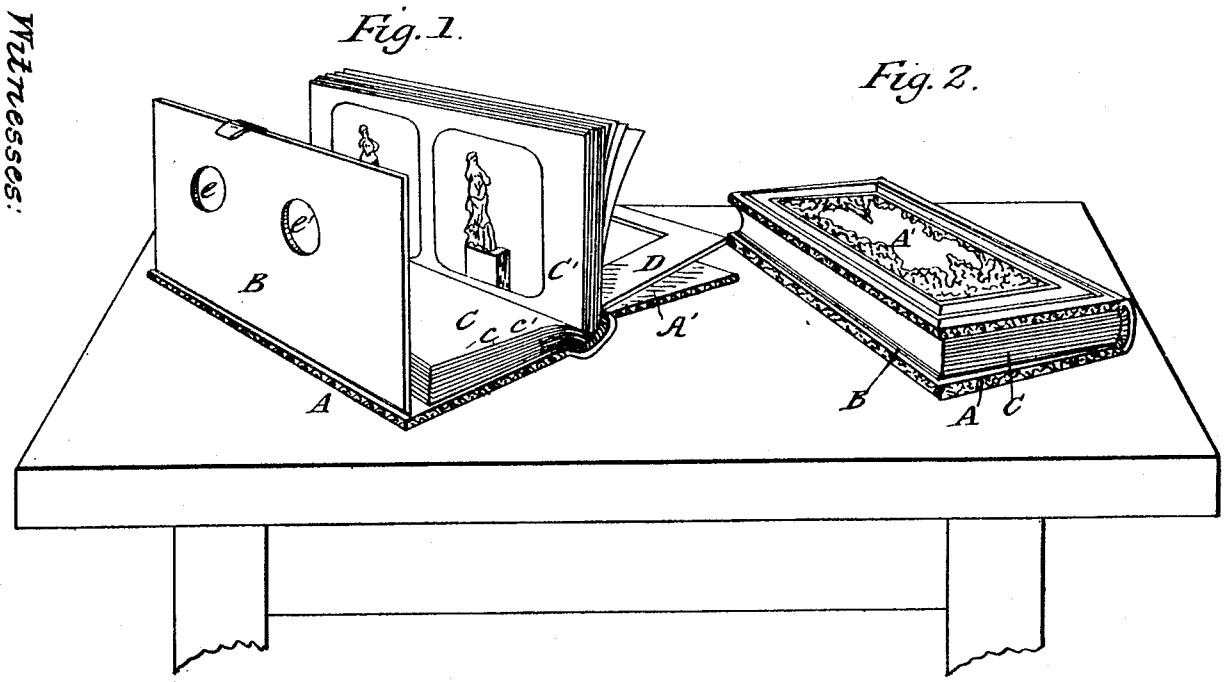
Witnesses:
Ben Morton
Wm H Morrison
Inventor:
John F. Mascher
N. PETERS, Photo-Lithographer, Washington, D.C.